Patented May 3, 1927.

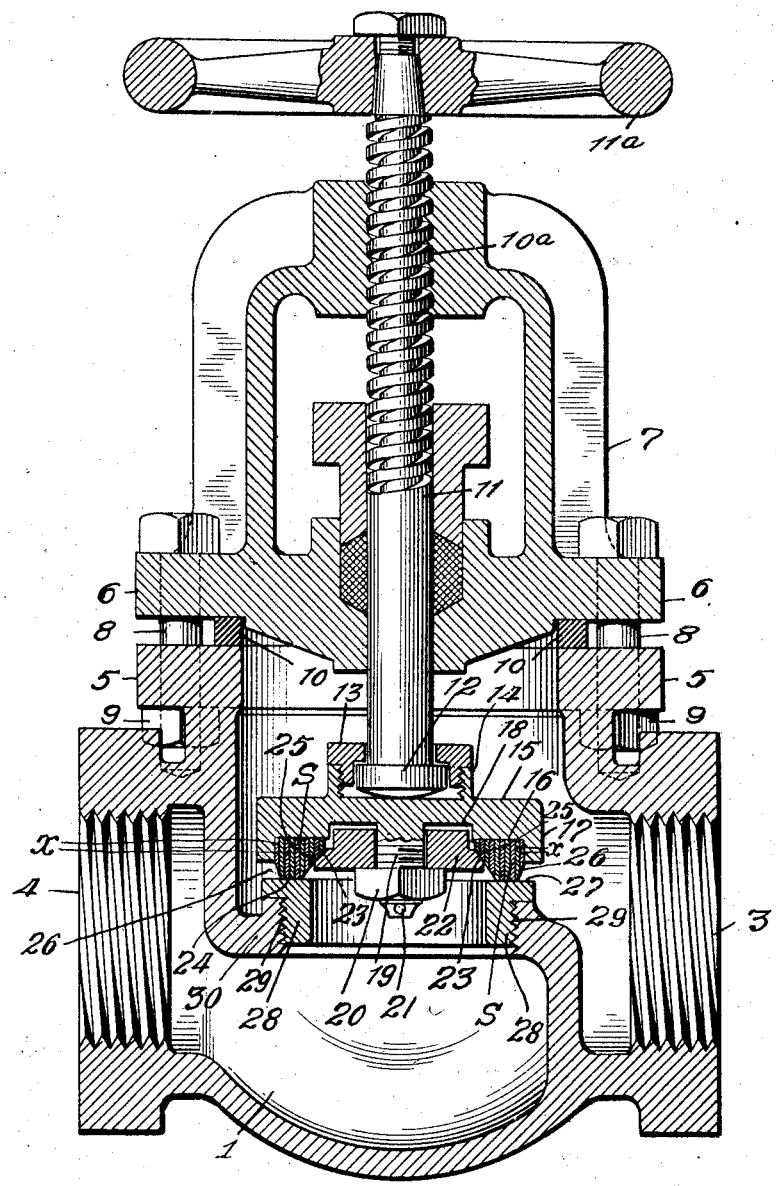

1,627,299

UNITED STATES PATENT OFFICE.

WYLIE GEMMEL WILSON, OF ELIZABETH, NEW JERSEY, ASSIGNOR TO LOOSE SEAT VALVE COMPANY, OF DOVER, DELAWARE, A CORPORATION OF DELAWARE.

LIFTING VALVE.

Application filed January 6, 1926. Serial No. 79,571.

This invention relates to improvements in valves. Its object is to produce a non-sticking valve having a fluid-tight port joint in which one of the complementary sealing surfaces is a flat wall enclosing a port and in which the other sealing surface is of compacted, flatwise superposed, united, negligibly or approximately inelastic material shown wound upon itself, as and for purposes more fully described hereinafter.

In the drawing forming a part hereof and illustrating the invention, the view is a vertical, centrally sectionalized elevation of a valve containing the invention.

In the drawings the under casing member 1 has a diaphragm formed with a threaded opening between the intake and discharge chambers of the valve casing. Casing member 1 also has a port 3 and a port 4, one or the other of which forms an intake port and one or the other of which forms a discharge port. Casing member 1 has a flange 5 bolted to a flange 6 of the bonnet 7 by bolts 8 and nuts 9. A gasket 10 is interposed between the flanges and the upper casing member is provided with the usual interior means for carrying a threaded valve stem 11 which at 10ª is in threaded engagement with a threaded hole through the bonnet top and has a handle 11ª for use in reciprocating the spindle to seat and unseat the reciprocable sealing member. The under end of the stem is provided with a flanged enlargement 12 which is held in an inverted cupped nut 13 through the upper wall of which the stem passes freely, the nut being threaded into the upstanding, annular threaded flange 14 of a carrier 15 for a reciprocable sealing member.

Carrier 15 is a disk circularly recessed at 16 on its under face forming an annular side wall 17. The bottom of this recess is centrally and circularly recessed at 18. From the bottom of recess 18, a threaded stud 19 centrally depends and carries a clamping nut 20, which when homed, is preferably locked in place by a cotter pin 21, the nut then holding in place a sealing ring clamping plate 22 the front peripheral wall of which is inwardly and upwardly bevelled at 23, the back side of the plate being reduced in diameter for entrance into the recess at 18. The sealing ring S is located in the recess 16 and has a peripheral wall opposed to and clamped against the annular wall 17 of the carrier. The interior, circumferential wall of the sealing ring is inwardly and upwardly bevelled from the under, flat sealing surface 24 of the sealing ring part way and nearly to the upper and inner circumferential corner of the sealing ring forming a tapered surface at 25 against which the tapered wall 23 of the clamping plate is pressed home by nut 20. Thus, the sealing ring has a peripheral portion spacedly apart from its sealing surface and is heavily compacted against the wall 17 and between the wall 17 and the tapered peripheral wall 23 of the clamping plate. The sealing surface end of the sealing ring projects beyond the end wall of the ring encircling, peripheral wall 17 and also beyond the face of the clamping plate. The peripheral corner of the sealing ring adjacent the sealing surface is bevelled off at 26. The seal forming joint is formed when the valve is seated on the flat upper wall of the ported member threaded into the diaphragm. The sealing surface of the sealing ring is annular and its interior diameter is substantially greater than the diameter of the port or in other words, the recess in the under face of the combined nut, clamping plate and sealing ring, due to the projection of the sealing surface beyond the face of the clamping plate, is substantially greater than the cross-sectional area of the port.

The flat port enclosing wall on which the sealing surface of the sealing ring is seated is indicated by 27 and is the upper wall of a ported annulus 28 which is threaded at 29 into the diaphragm 30 which divides into an intake and outlet chambers the under casing member 1.

The sealing ring S is made up of successive, flatwise superposed, strongly compacted, united layers X of material which form a ring of stiff and of but slightly elastic character. It is preferably composed of asbestos rings or windings and is only very slightly compressible. As a consequence, it substantially retains its form under pressure. Being made of united layers commonly vulcanized together, it is necessary to keep it compressed and supported while the valve is in use, because it softens to a considerable but variable extent when subjected to steam.

One advantage of the described construction is that the upwardly or backwardly and inwardly tapering, interior circumferential wall of the packing ring, where it projects beyond the face of the clamping plate, cannot be compressed into the port when the valve is seated and so have edges of the superposed laminæ cut or frayed against the corner of the port adjacent the sealing wall 27. But in a more important way and more broadly considered, those laminæ of the sealing ring, the edges of which are in its sealing face, are supported both peripherally and interiorly circumferentially by adjacent laminæ the edges of which are bevelled off and the latter bevelled edge laminæ also serve as spacers for spacing apart the sealing surface forming laminæ from the rigid, interior supporting wall 17 and the rigid, peripheral tapered wall 23 of the clamping plate. The sealing surface of the sealing ring S is formed by edges of its intermediate laminæ, which sealing edges it is the object of this invention so to support as to prevent fraying or tearing under conditions of use. If tearing or fraying is started in the edge of a layer of a sealing surface, it is apt to be extended to one or more layers in the sealing surface and effect leakage.

This sealing ring of and by itself forms the subject matter of my application Ser. No. 79,568, filed Jan. 6, 1926, and the present structure is a form of my invention more broadly claimed in my application Ser. No. 79,572, filed Jan. 6, 1926 and allowed May 10, 1926.

What I claim is:

In a valve, the combination with a dense, slightly elastic, valve port sealing annulus of united laminæ and which annulus has a projecting sealing surface composed of laminæ edges between adjacent, tapering laminæ edges and which annulus also has clampable surfaces one adjacent each tapered laminæ edge portion; the tapered laminæ serving, when in use, to sustain one another and also to sustain the laminæ edges in the sealing surface, and then also serving as spacers to hold the sealing surface edges apart from clamping means for engaging said clampable surfaces; one of said clampable surfaces being a peripheral wall portion and the other being an interior, conical portion of the annulus; of a carrier for the annulus, said carrier having an annular recess, the circular wall of which is in contact with said peripheral wall portion of the annulus; an annulus clamping plate having a conical wall engaging the interior conical portion of the annulus and means for holding the clamping plate in place and compressively against said interior conical portion of the annulus.

Signed at New York in the county of New York and State of New York this 23" day of December, A. D. 1925.

WYLIE GEMMEL WILSON.